Aug. 7, 1962  S. A. MRENNA ET AL  3,048,685
BREAKER SUPPORT

Filed Oct. 20, 1958  2 Sheets-Sheet 1

WITNESSES:
Bernard R. Gieguey
Wm. B. Sellers.

INVENTORS
Stephen A. Mrenna and
John M. Groves.
BY
Paul O. Harber.
ATTORNEY

Aug. 7, 1962    S. A. MRENNA ET AL    3,048,685
BREAKER SUPPORT
Filed Oct. 20, 1958    2 Sheets-Sheet 2

United States Patent Office 3,048,685
Patented Aug. 7, 1962

3,048,685
BREAKER SUPPORT
Stephen A. Mrenna, Beaver, and John N. Groves, Monaca, Pa., assignors to Westinghouse Electric Corporation, East Pittsburgh, Pa., a corporation of Pennsylvania
Filed Oct. 20, 1958, Ser. No. 768,344
10 Claims. (Cl. 200—168)

This invention relates to circuit breakers and, more particularly, to support means for supporting circuit breakers in enclosures.

An object of this invention is to provide novel support means for supporting a circuit breaker in an enclosure to facilitate mounting the circuit breaker.

Another object is to provide support means in a metal enclosure for locating and supporting a circuit breaker in the enclosure to facilitate mounting the circuit breaker.

Another object of the invention is to provide a metal enclosure for a circuit breaker with support members for supporting the circuit breaker with the breaker mounting holes aligned with the tapped holes in the enclosure while the breaker mounting screws are being put in place.

The invention, both as to structure and operation, together with additional objects and advantages thereof, will be best understood from the following detailed description thereof when read in conjunction with the accompanying drawings.

Figure 1:
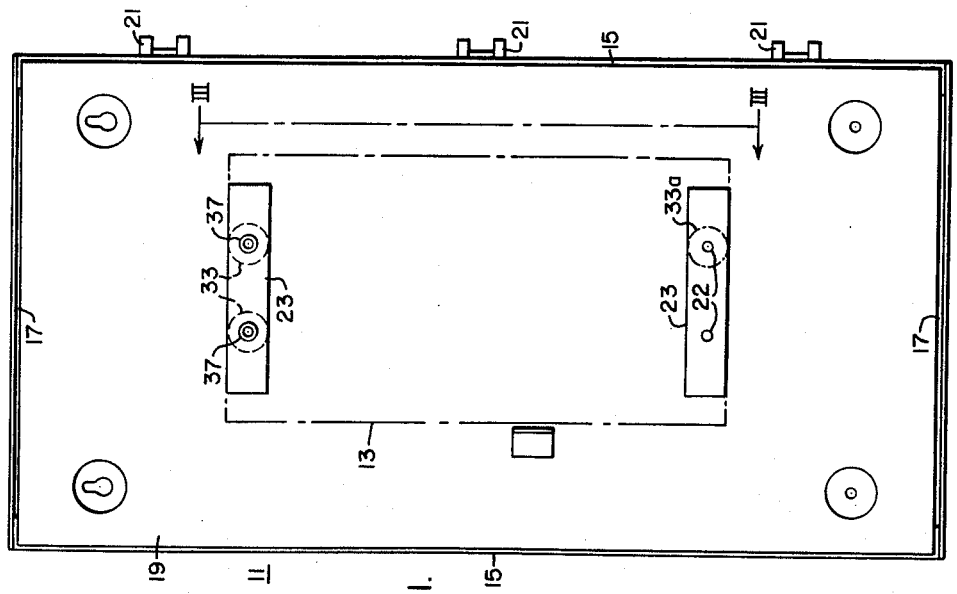
FIGURE 1 is a front elevational view of an enclosure having support means therein for receiving a multipole circuit breaker.
Figure 3:
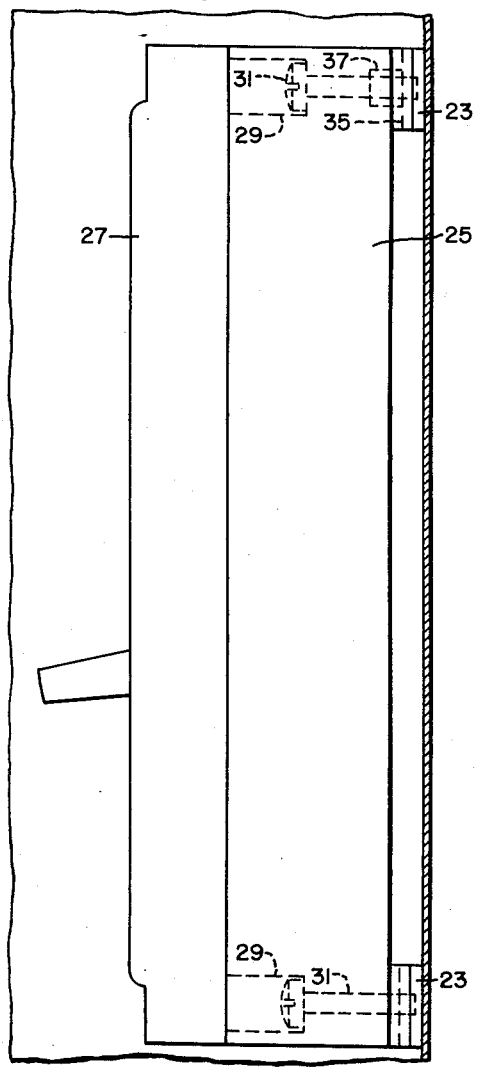
FIG. 3 is an enlarged vertical sectional view through the enclosure taken on line III—III of FIG. 1 showing a side elevation of a circuit breaker mounted therein.

Referring to FIGS. 1 and 3 of the drawings, a sheetmetal enclosure 11 is provided for enclosing a circuit breaker 13, the outline of which is shown in FIG. 1 by dot and dash lines. The enclosure 11 comprises side walls 15, end walls 17, a bottom plate 19 and a cover not shown herein but which is mounted on hinge members 21 on one of the side walls 15. Such sheetmetal enclosures are usually provided with tapped holes 22 in the bottom plate or in mounting brackets 23 for receiving the mounting screws of the circuit breaker to be mounted therein.

Figure 4:
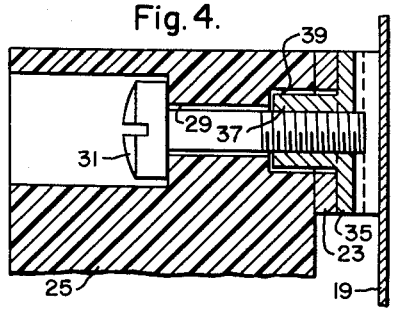
FIG. 4 is a detail sectional view showing a portion of the circuit breaker mounted on the support means.
Figure 5:
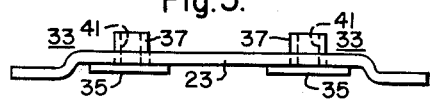
FIGS. 5 and 6 are detail views showing the mounting brackets having the support means thereon for supporting different types of circuit breakers.
Figure 6:
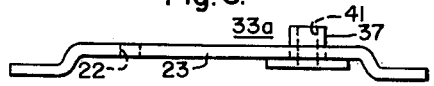

The circuit breaker 13 to be mounted in the enclosure is of the molded case type and comprises generally a base portion 25 and cover portion 27 both of molded insulating material. The base portion 25 is provided with a plurality of counterbored mounting holes 29 (FIGS. 3 and 4) for receiving mounting screws 31 by which the circuit breaker is rigidly secured to the enclosure.

Since some circuit breakers of the type shown weigh as much as fifty pounds, difficulty has been experienced in holding the breaker in position while aligning the mounting holes in the breaker with the tapped holes in the enclosure so that the mounting screws can be inserted. It is desirable that the workman have at least one hand free to insert the mounting screws and turn a screw driver. Otherwise, two men would be required to mount the heavier breakers in the vertical enclosure.

Support means are provided for supporting the breaker in the enclosure to facilitate aligning the mounting holes in the breaker housing with the tapped holes in the enclosure. The support means comprises flanged support members 33 having flange portions 35 which are rigidly secured, as by welding, to the rear of the upper mounting brackets 23. Each of the support members 33 is provided with a portion 37 which extends through an opening in the mounting bracket 23 and toward the front of the enclosure. The base portion 25 of the breaker housing adjacent the mounting holes 29 is provided with enlarged openings 39 which are slightly larger than the portion 37 of the support members which support members are provided with tapped openings 41 for receiving the breaker mounting screws 31.

When mounting a circuit breaker in the enclosure, the openings 39 of the breaker housing are engaged with the portions 37 of the support members 33 which then support the breaker in the proper position to facilitate alignment of the mounting holes 29 in the breaker with the tapped holes 22 (FIG. 1) in the lower mounting bracket 23 and with the tapped holes 41 in the support members 33 at the upper end of the breaker. The mounting screws 31 are then inserted in position and tightened to hold the circuit breaker rigidly in position.

Figure 7:
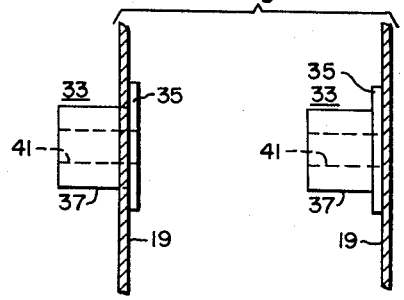
FIG. 7 illustrates different ways of attaching the breaker support members to the enclosure.

As shown in FIG. 7, the support members 33 may be secured directly to the bottom plate 19 of the enclosure either at the front or rear side thereof. In the latter case, an opening is provided in the bottom plate through which the portion 37 extends toward the front of the enclosure.

In the event that a single-pole breaker or a two-pole breaker is to be mounted in the enclosure, one of the support members 33 on the upper mounting bracket 23 is omitted and a support member is secured to the bottom mounting bracket as shown by dot and dash lines at 33a in FIG. 1, in line with the remaining support member on the upper bracket 23. An enlarged opening such as 39 (FIG. 4) is provided at the lower end of the breaker housing for engaging the support member 33a. The one or two-pole breaker is placed in position over the upper and lower support members which support the breaker in position while the mounting holes in the circuit breaker housing are aligned with the tapped holes in the support members, and the mounting screws are inserted and tightened.

Figure 2:
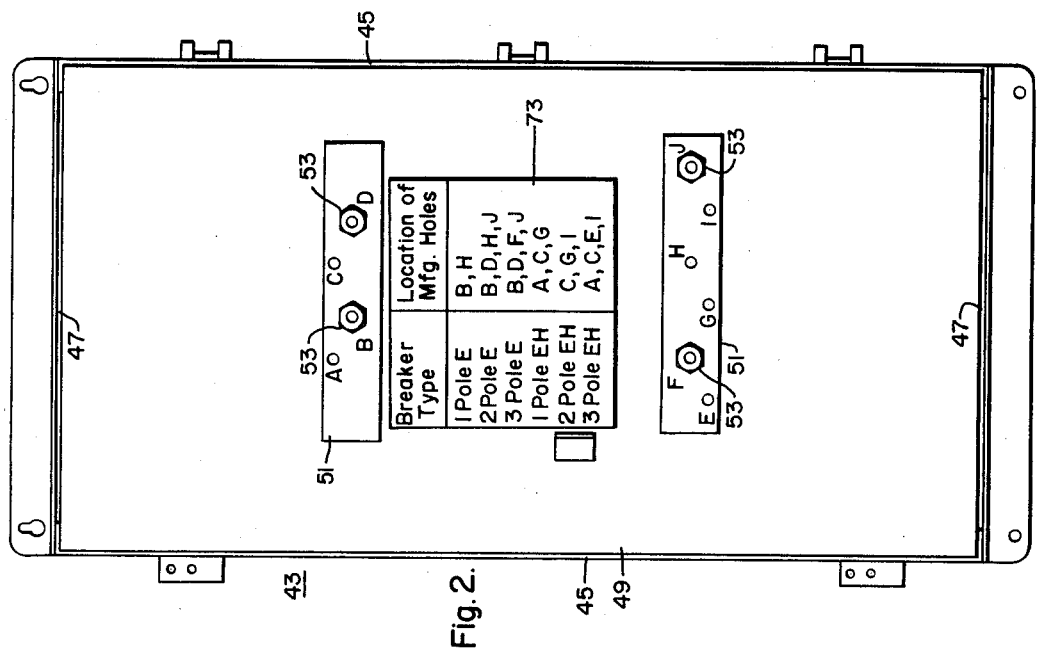
FIG. 2 is a view similar to FIG. 1 but showing the support means arranged to receive and support different types of one, two and three pole circuit breakers.
Figure 8:
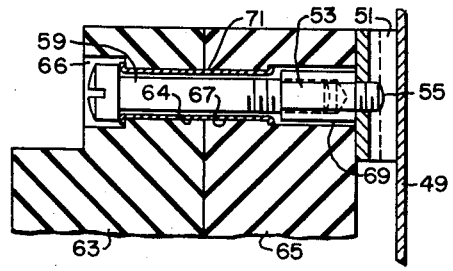
FIG. 8 is a detail sectional view showing a portion of the circuit breaker mounted on the support means of FIG. 2.
Figure 9:
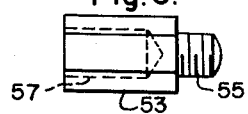
FIG. 9 is a detail view of the support stud shown in FIG. 8.

FIG. 2 illustrates an enclosure, indicated generally at 43, which is arranged to secure and support different types of one, two and three pole circuit breakers. The enclosure 43 comprises side walls 45, end walls 47 and a bottom plate 49. Upper and lower mounting brackets 51 are rigidly secured to the bottom plate 49. The upper mounting bracket is provided with tapped holes A, B, C and D, and the lower mounting bracket 51 is provided with tapped holes E, F, G, H, I and J for receiving support studs 53 (FIGS. 8 and 9). Support studs 53 are inserted in the tapped holes according to the number and spacing of the mounting holes in the housing of the circuit breaker to be mounted in the enclosure.

As shown in FIG. 9, the support stud 53 is hexagon in cross section and has a threaded portion 55 for engaging the tapped holes in the mounting brackets 51. The support stud 53 has a tapped hole 57 therein for receiving a breaker mounting screw 59 (FIG. 8). A portion of the housing of the circuit breaker to be mounted in the enclosure shown in FIG. 2 is shown in FIG. 8 and comprises a base portion 65 and a cover portion 63 both being of molded insulating material. Mounting holes 64, one of which is shown in FIG. 8, are provided in the cover portion 63 and matching holes 67 are provided in the base portion 65 of the housing for receiving the mounting screws 59. The holes 64 in the cover portion are counterbored as at 66 to receive the head of the screw 59 and the holes 67 in the base portion terminate in enlarged openings 69 for engaging the support studs 53. The base and cover portions 65 and 63 are rigidly held together by means of tubular rivets 71 which extend through the mounting holes 64 and 67 and the ends of the rivets are riveted over against the bottom of the counterbore 66 in the cover and the bottom of the opening 69 in the base to rigidly hold the base and cover together. The mounting screws 59 pass through the bores of the rivets 71 and are screwed into the tapped openings in the support studs 53.

As seen in FIG. 2, support studs 53 have been mounted in tapped openings B and D in the upper mounting bracket 51 and in openings F and J in the lower mounting bracket. Referring to the chart indicated at 73, FIG. 2, it will be seen that this arrangement of support studs 53 is adapted to receive a three-pole, type E circuit breaker. The breaker is installed in the previously-described manner, that is, by engaging the openings 69 in the breaker housing with the support studs 53 which then support the circuit breaker in position while the mounting holes 64—67 are aligned with the tapped holes in the support studs 53 and the mounting screws 59 are inserted and tightened.

We claim as our invention:

1. In combination, an enclosure for an electrical device, said electrical device including a housing of molded insulating material having openings therein for receiving securing means, mounting means on said enclosure having openings therein for receiving the securing means, and support members on said mounting means for supporting said electrical device, each of said support members having a portion disposed to be positioned in one of said openings in said electrical device to facilitate alignment of said openings in said electrical device with said openings in said mounting means for receiving said securing means.

2. In combination, an enclosure for an electrical device, said electrical device including a housing having mounting holes therein, mounting means secured to said enclosure and having holes therein corresponding to said mounting holes in said housing, and support members secured to said mounting means for supporting said electrical device, each of said support members having a portion to be disposed in one of said mounting holes in said housing to align said mounting holes in said housing with the holes in said mounting means to permit the insertion of securing means to secure said electrical device to said enclosure.

3. In an enclosure for a circuit breaker, said circuit breaker comprising a housing having mounting holes therein, spaced mounting brackets secured to said enclosure and having holes therein corresponding to the mounting holes in said housing, support members secured to one of said mounting members for supporting said circuit breaker while said mounting holes and said holes in said mounting members are being aligned to receive securing means to secure said circuit breaker to said enclosure, and said support members having holes therein for receiving certain of the securing means.

4. In an enclosure for a circuit breaker, said circuit breaker comprising a housing having mounting holes at each end thereof, a pair of spaced mounting members, one of said mounting members having holes therein corresponding to the mounting holes at one end of said housing, support members secured to the other of said mounting members and having holes therein corresponding to the mounting holes at the other end of said housing, said support members supporting said circuit breaker while said holes are being aligned to receive means to secure said circuit breaker to said enclosure.

5. In an enclosure for a circuit breaker having a housing of molded insulating material, said housing having mounting holes in each end thereof, a pair of spaced mounting brackets secured to said enclosure and each having a plurality of holes therein, a plurality of support members selectively insertable in said holes in said mounting brackets according to the location of the mounting holes in said circuit breaker housing, said support members having holes therein for receiving securing means and supporting said circuit breaker to permit alignment of said mounting holes in said housing with the holes in said support members.

6. An enclosure for mounting circuit breakers of different types, said circuit breakers having differently located mounting holes, mounting brackets secured to said enclosure and having a plurality of holes therein, a plurality of support members selectively insertable in the holes in said brackets according to the location of the mounting holes in the particular circuit breaker to be mounted in said enclosure, said support members having holes therein for receiving mounting screws, and said support members engaging and supporting said circuit breaker to facilitate alignment of the mounting holes in said breaker with the holes in said support members.

7. In an enclosure for a circuit breaker, said circuit breaker comprising a housing having mounting holes therein, spaced mounting members secured to said enclosure and having holes therein corresponding to the mounting holes in said housing, a support member secured to one of said mounting members, said support member having a tubular portion for aligning said mounting holes in said housing with said holes in said mounting members to permit the insertion of securing means through said mounting holes in said housing and said holes in said mounting members to secure said circuit breaker to said enclosure, whereby when said circuit breaker is secured to said enclosure said tubular portion is disposed within one of said mounting holes and one of said mounting means passes through the opening defined by said tubular portion.

8. An enclosure for mounting circuit breakers of different sizes, said circuit breakers having mounting holes therein, mounting brackets secured to said enclosure and having a plurality of holes therein, a plurality of support members selectively insertable in the holes in said brackets according to the size of the circuit breaker to be mounted in said enclosure, each of said support members having a tubular portion to protrude into one of said mounting holes in said circuit breaker to align said mounting holes with said holes in said mounting brackets whereby securing means may be inserted through said mounting holes in said tubular portions and said holes in said mounting brackets.

9. In combination, an enclosure for a circuit breaker, said enclosure having holes therein, said circuit breaker including a housing having mounting holes therein, a plurality of support members attached to said enclosure for supporting said circuit breaker, each of said support members having a hole therein in alignment with one of said holes in said enclosure, each of said support members having a portion disposed to be positioned in one of said mounting holes in said housing for aligning said aligned holes in said support members and said enclosure with said mounting holes in said housing whereby said holes may receive means for securing said circuit breaker to said enclosure.

10. In combination, an enclosure for a circuit breaker, said enclosure having holes therein, said circuit breaker including a housing having mounting holes therein, a plurality of support members attached to said enclosure, for supporting said circuit breaker, each of said support members having a hole therein in alignment with one of said holes in said enclosure, each of said support members having a tubular portion to be disposed in one of said mounting holes in said housing for aligning said aligned holes in said support members and said enclosure with said mounting holes in said housing whereby said holes may receive means for securing said circuit breaker to said enclosure.

References Cited in the file of this patent

UNITED STATES PATENTS

| | | |
|---|---|---|
| 1,897,954 | Olier | Feb. 14, 1933 |
| 2,050,378 | Randall | Aug. 11, 1936 |
| 2,210,696 | West | Aug. 6, 1940 |
| 2,831,944 | Miller | Aug. 22, 1958 |
| 2,879,491 | Shapiro | Mar. 24, 1959 |
| 2,902,665 | D'Amico | Sept. 1, 1959 |
| 2,904,771 | Burtt et al. | Sept. 15, 1959 |
| 2,916,675 | Middendorf | Dec. 8, 1959 |
| 2,928,998 | Brumfield | Mar. 15, 1960 |
| 2,933,713 | Jackson et al. | Apr. 19, 1960 |
| 2,953,767 | Jackson et al. | Sept. 20, 1960 |

FOREIGN PATENTS

| | | |
|---|---|---|
| 1,138,301 | France | Jan. 21, 1957 |